Figure 4:
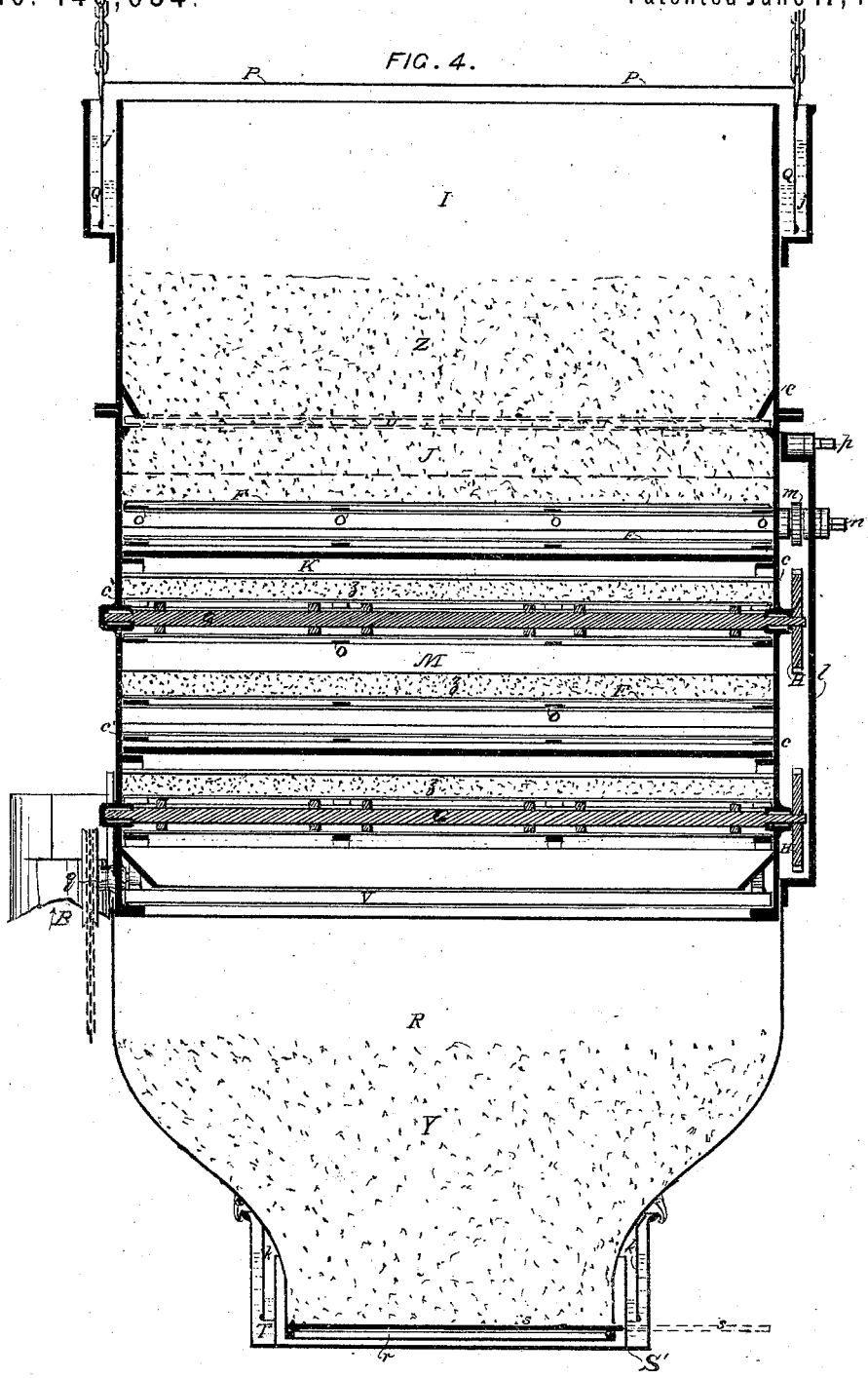

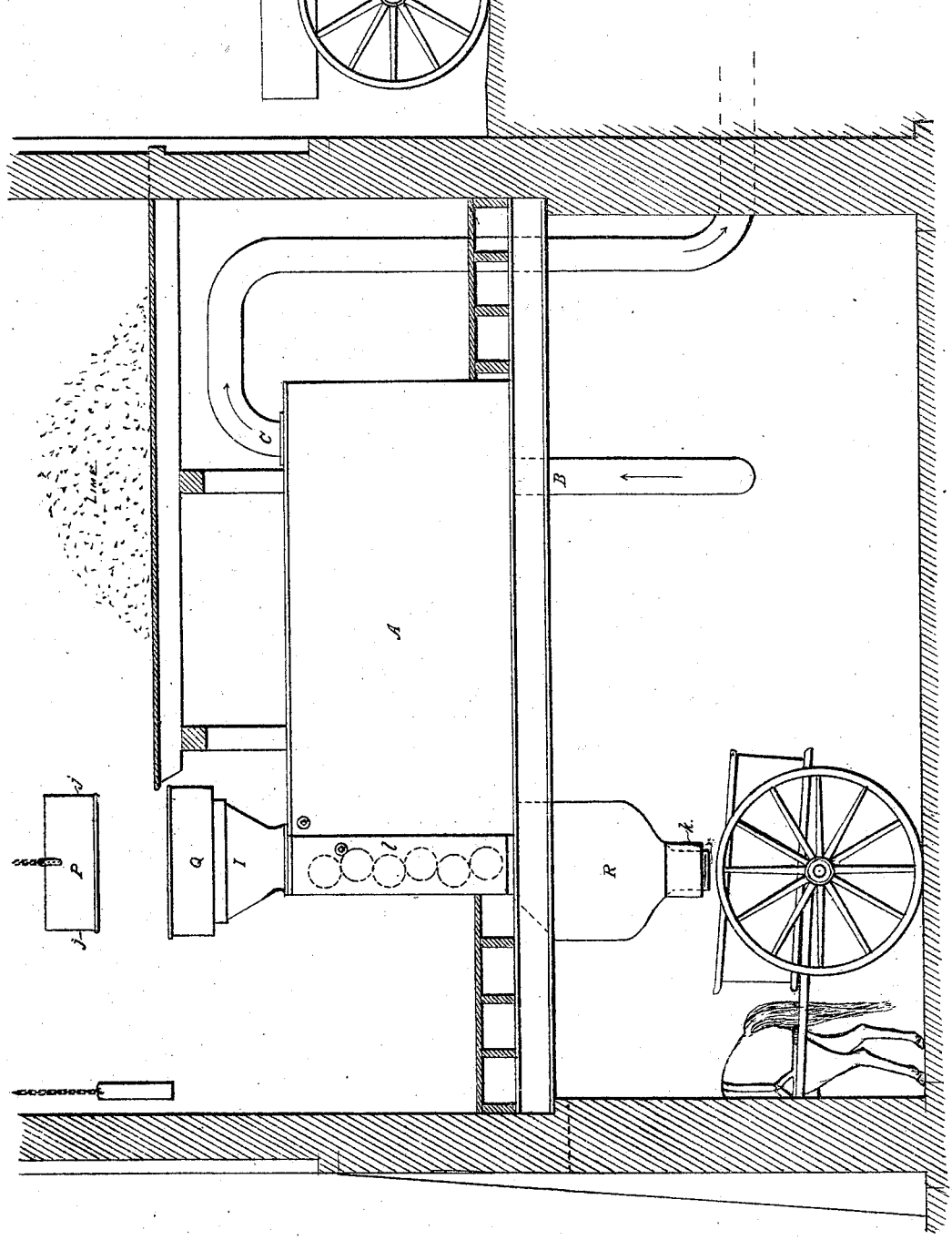

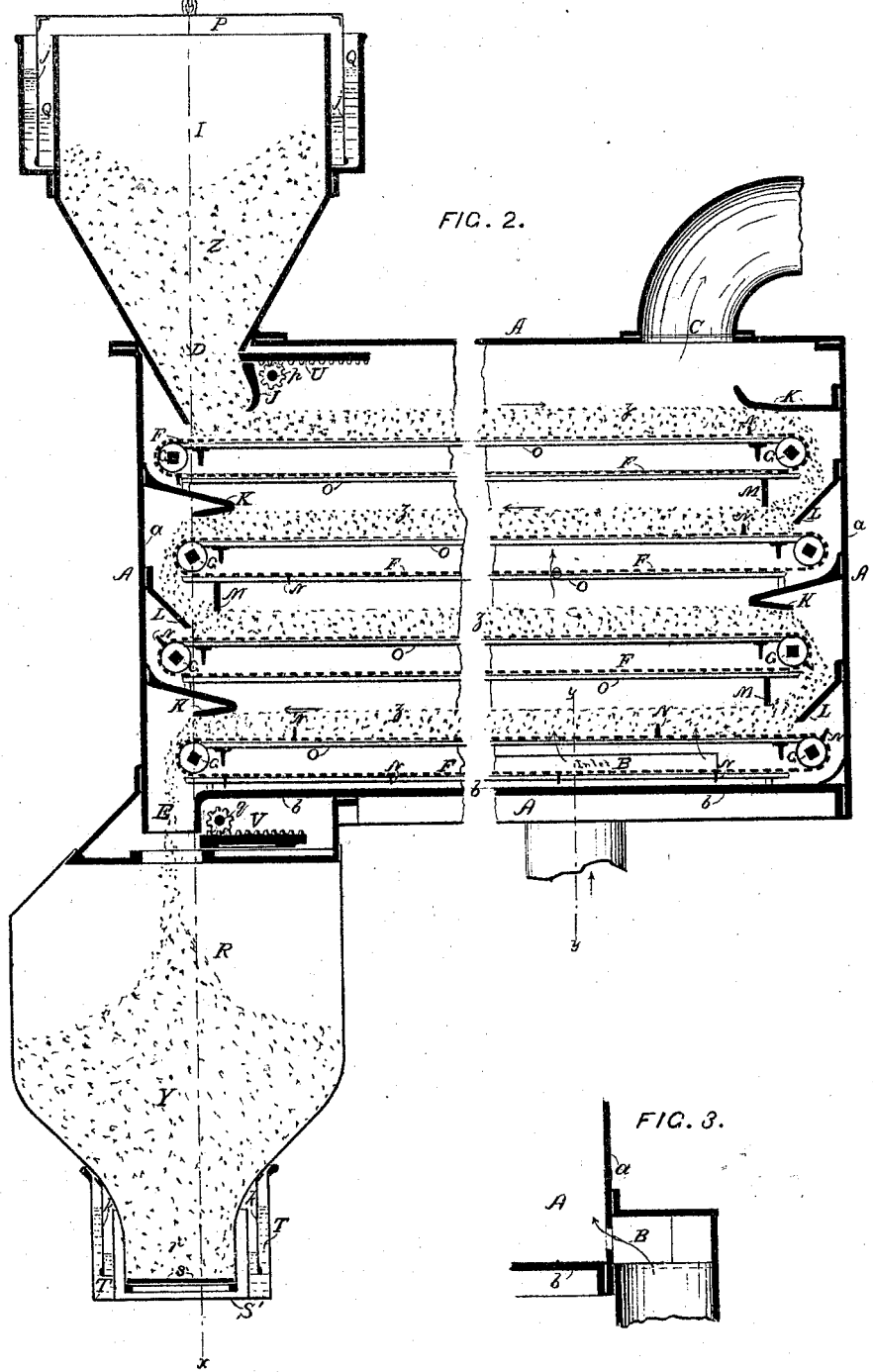

J. T. GOODFELLOW & F. A. SABBATON.
Gas-Purifiers.
No. 140,034. Patented June 17, 1873.

J. T. GOODFELLOW & F. A. SABBATON.
Gas-Purifiers.
No. 140,034.
Patented June 17, 1873.
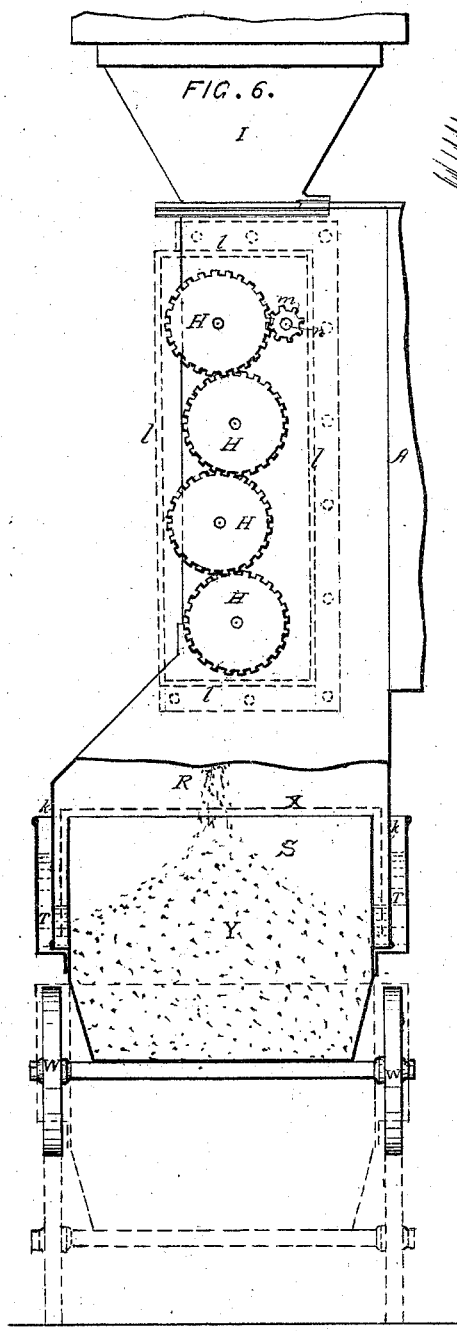
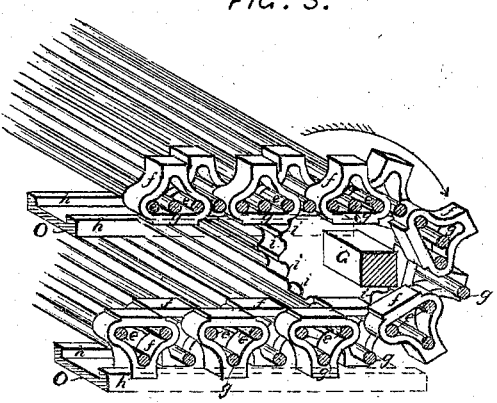
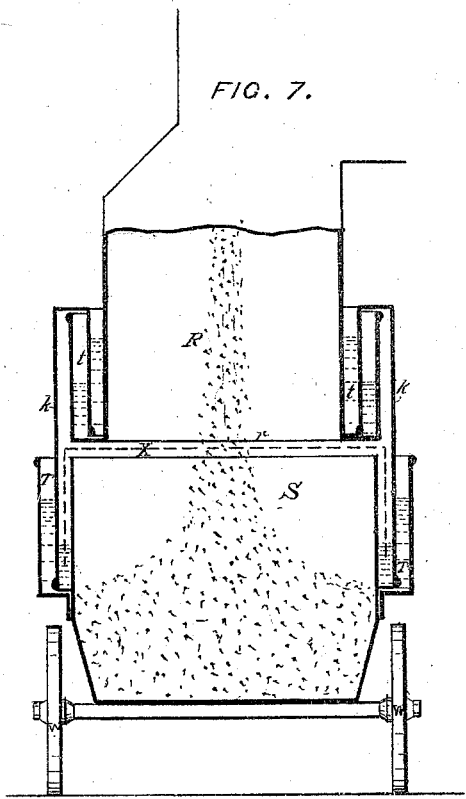

UNITED STATES PATENT OFFICE.

JAMES T. GOODFELLOW AND FREDERICK A. SABBATON, OF TROY, NEW YORK.

IMPROVEMENT IN GAS-PURIFIERS.

Specification forming part of Letters Patent No. 140,034, dated June 17, 1873; application filed May 1, 1873.

*To all whom it may concern:*

Be it known that we, JAMES T. GOODFELLOW and FREDERICK A. SABBATON, each of the city of Troy, in the county of Rensselaer and State of New York, have jointly invented certain Improvements in Gas-Purifiers, of which the following is a specification, reference being had to the accompanying four sheets of drawings.

One part of our invention consists of a gas-purifier having an endless screen, or two or more such screens, arranged in a horizontal or somewhat inclined position or positions in a close chamber, with a sheet-like layer or layers of lime or other suitable purifying material upon the said screen or screens, and inlet and outlet passages suitable for the admission and discharge of the gas and the purifying material, and constructed so that the gas is compelled to pass through the said layer or layers of purifying material on the said endless screen or screens, and so that the spent purifying material will be discharged from the said endless screen or screens by turning the latter.

Another part consists in the combination of a hopper or magazine for the fresh purifying material, and a gas-purifier, having therein an endless screen or screens, so that the purifying material will be progressively delivered from the said hopper or magazine in a layer or layers upon the said endless screen or screens by turning the latter in the purifier.

Another part consists in the combination of a gas-purifier having therein one or more enless purifying screen or screens, a hopper or magazine, and a fixed or adjustable gage or gages, so as to secure the delivery of the purifying material from the hopper or magazine onto the next adjacent endless screen in a layer of even thickness by turning the said screen or screens.

Another part consists in the combination of a guard or guards with one or more endless purifying screen or screens in a gas-purifier, so as to thereby prevent the gas from escaping past the end or ends of the sheet-like layer or layers of purifying material on said endless screen or screens, at the place or places where the purifying material is discharged from the screen or screens by turning the latter.

Another part consists in the combination of a deflecting guard or guards with two or more endless purifying screens, arranged one over the other, and simultaneously turned in opposite directions in a gas-purifier, substantially as hereinafter described, so as to thereby not only cause the purifying material on the upper screen or screens to pass on to the next lower screen or screens by turning the screens; but so as to prevent the gas from escaping past the end or ends of the layer or layers of purifying material on said lower screen or screens, at the place or places where the material is received upon the screen or screens.

Another part consists in the combination of two or more endless purifying-screens, constructed and arranged in a gas-purifier, so that the the purifying material shall be progressively discharged from one screen to an adjacent one by turning the screens and a fixed or adjustable gage or gages, arranged so as to secure the delivery of the purifying material from one screen on to the other in a continuous layer of uniform thickness on the receiving-screen.

Another part consists in the combination of a clearing lag or lags with and upon the rotary endless screen or screens having its bottom or gas guard or guards constructed and arranged in respect to the said screen or screens, substantially as hereinafter set forth, so that purifying material which may fall through or from the screen or screens on to the said bottom or guard or guards, shall be removed therefrom and returned to the upper side of the said screen or screens by the said clearing lag or lags, as the screen or screens are being turned, and so that said lag or lags shall remove any accumulation of the purifying material at the turning ends of the screen or screens.

Another part consists of a gas-purifier, in which the purifying material is supported on one or more endless screen or screens, in which the apertures are automatically enlarged and contracted in or by the turning of the screen or screens in or after discharging of the material therefrom, and before the receiving of the fresh material thereon, so as to shake off ad hering material, and clear the apertures, and render them larger in the lower section than in the upper section of the screen, and permit whatever material may fall through the upper section of the screen to pass freely through the lower section thereof.

Another part consists of an endless gas-purifying screen, having transverse rods alternately linked and loosely held together, as hereinafter described.

Another part consists in the combination of a gas-purifier, through which the purifying material is passed in a sheet-like layer or layers on an endless screen or screens, a closed chamber which receives the spent purifying material discharged by the purifier, and a closed hopper or magazine, which delivers fresh purifying material to the endless screen or screens in the purifier, thereby the purifying material in the purifier can be changed either wholly or in part, as desired, by turning the said endless screen or screens to a greater or less extent without stopping the action of the purifier, and very little, if any, loss of gas.

Another part consists in the combination of a gas-purifier, having therein one or more endless purifying screen or screens, and a hopper or magazine furnished with a removable cover, made gas-tight by a hydraulic seal, and with or without a cut-off valve at the lower part of the magazine or hopper, substantially as hereinafter described, whereby the fresh purifying material can be put into the hopper or magazine, and can be delivered therefrom upon the said endless screen or screens in the purifier by turning said screen or screens, without stopping the passage of the gas through the purifier, and with only slight loss of gas therefrom.

Another part consists in the combination, with a gas-purifier from which the spent purifying material is discharged automatically, substantially as hereinafter described, of a passage or receptacle having a cut-off valve at its upper part, and an aperture at its bottom, with or without a valve therein, and a removable cover connected with said passage or receptacle by a hydraulic seal, so that the spent purifying material can be progressively delivered by the purifier into the said passage or receptacle, and can be removed from the latter, all while the purifier is in action, and will only very little, if any, loss or escape of gas from the purifier.

Another part consists in the combination, with a gas-purifier having an elevated discharge-passage with a surrounding dip-flange thereon, of a removable open-top vessel with or without carrying-wheels or sled-runners thereon, and having a surrounding water-trough into which the said dip-flange enters, and thereby seals the vessel to the discharge-passage, so that no gas can escape while the spent purifying material is being discharged from the purifier into said vessel, and so that upon removing said vessel from the purifier the flange of a suitable cup-like cover placed over said vessel will dip into said water-trough and seal the vessel, and thus prevent the escape therefrom of the fetid gases given off by the spent purifying material while being conveyed away in said vessel.

Another part consists of a gas-purifier in which the gas is passed through two or more sheet-like layers of the purifying material supported on screens, and also through a vacant space or spaces between said layers, and in which the purifying material can be introduced into the purifier, changed in the said layers therein, and discharged from the purifier, all without stopping the flow of gas through the purifier and without interrupting the purifying action of the latter, and with only very little if any loss or escape of gas therefrom.

In the aforesaid four sheets of drawings, Figure 1 is a side elevation of a portion of one form of our invention or improved apparatus mounted in a gas-house. Fig. 2 is a central vertical longitudinal section of the end portions of one form of our improved purifier and attachments. Fig. 3 is a section, at the lines $y\,y$ in Fig. 2, of a gas-passage into the purifier. Fig. 4 is a transverse vertical section at the line $x\,x$ in Fig. 2. Fig. 5 is an enlarged view of a part of a rotary endless screen for the purifier. Figs. 6 and 7 are partial sectional elevations of parts of our invention.

A is a gas-tight chamber having an inlet-passage, B, Fig. 2, and an outlet-passage, C, for the gas, and an inlet-aperture, D, and an outlet, E, for the purifying material. F F are endless screens, arranged one over another, between the said passages B and C, and mounted on rotary shafts, G, which are connected together by toothed wheels H Fig. 6, whereby all the screens F can be turned simultaneously, and the adjacent ones in opposite directions. I is a magazine, or hopper, from which the fresh lime or other purifying material Z is progressively delivered, in the form of a layer, upon the upper endless screen by turning that screen.

It is of much importance that the several layers of purifying material, $z$, on the screens should all be in a light, porous condition, and of even thickness throughout each layer; so that the gas shall pass through all parts of each layer with facility, and not through some portions more easily than through others. J is a stationary or adjustable gage, arranged so as to equalize the thickness of the layer of purifying material delivered from the magazine or hopper I upon the upper screen by turning the latter, without compressing or packing that layer. Two or more gages can be used, one after another, to accomplish the same purpose.

To compel the gas, in passing from the inlet B through the chamber A to the outlet C, to pass through the layers of purifying material on the screens, and not escape past the ends of the layers; and to secure the proper delivery of the purifying material from one screen to the next one below by turning the screens, any suitable guards, guides, or means, of a rotary, valve-like, or other nature, or any co-operating construction and arrangement of the ends $a\ a$ of the chamber A and the endless screens, may generally be employed; but we commonly prefer, for cheapness, the arrangement of guards hereinafter specified for such purposes.

The guards K, Fig. 2, are arranged tight against the ends $a\ a$ of the chamber A, and over and against, and so as to somewhat compress the layers $z$ of purifying material at or near the places where such material is discharged from the screens, and thereby prevent the escape of the gas past the discharging end of such layers.

The guards L are arranged tight against the ends $a\ a$ of the chamber A, and in in-inclined positions between the discharging and receiving parts of the adjacent screens, so as to thereby secure the progressive delivery of the purifying material from the upper screens to the next lower ones by turning those screens simultaneously in opposite directions, and also prevent the escape of gas past the receiving-ends of the layers of purifying material on such lower screens. M M are adjustable or stationary gages arranged over the receiving places of the endless screens which receive the material from the next screens above, so as to thereby secure the distribution and formation of the material thus received into sheet-like layers of even thickness on such lower receiving-screens. N N, Fig. 2, are lags secured to, and turning with, and projecting from the endless screens F, and arranged in respect to the upper surface of the bottom $b$ of the chamber A and the upper sides of the guards K, so that those lags will remove fallen purifying material from the bottom $b$ and guards K, and return such material to the upper sides of the screens and remove any obstructing purifying material from their path. The screens F, gages J and M, and guards K and L extend across the chamber A (Fig. 4) from one side, $c$ to the other, $c'$. The screens may be prevented from sagging by longitudinal rails $o$.

Although the endless screens F may generally be of any suitable construction, we prefer to have them made so that the openings through each screen will be enlarged while or just after passing the turning place where the purifying material is discharged from the screen, and contracted again just before reaching the place where the purifying material is received on the screen, so as to thereby clear the openings through the screen at each turn of the latter, and prevent the material which may fall through the upper section of the screen from accumulating on the upper side of the lower section thereof. Different kinds of such screens can be used, as, for instance, one having transverse slats hinged or jointed at one edge only to endless chains or bands, so that the slats will, by gravity, lie flatwise in the upper section of the screen, and hang edgewise in the lower section. Another kind, which we commonly prefer for its clearing action, is shown in part in Fig 5, and has transverse rods, of which alternate ones, $e$, are connected together by links $f$, and the intermediate rods $g$ are loosely held in and by openings through the links, so that all of the rods $e$ and $g$ in the upper section of the screen are in or nearly in one and the same plane and only a little separated from each other; and so that in turning from the upper section to the lower one, the rods $g$ will fall below the rods $e$ and thereby jar off adhering material, and make larger spaces between the rods; and so that in turning from the lower section of the screen to the upper one, the rods $g$ will return to the same plane as, and directly between, the rods $e$. Flanges $h$, on the rails $o$, may keep the links $f$ in proper position on the rods; and the rods $e$ may engage with flutings $i$ in wheels on the shafts $g$, to secure the turning of the screens by the shafts.

The magazine or hopper I has an open top with a removable cup-like cover P, and a surrounding water-trough, Q, into which the flange $j$ of the cover dips and thereby seals the top of the magazine and the latter has a gas-tight connection with the chamber A. R (Figs. 2, 4, 6, and 7,) is a passage or receptacle which has a gas-tight connection with the chamber A, and has an opening, $r$, in its bottom with or without a valve, $s$, therein; and a removable cover or vessel, S or S', is arranged under the opening, and has a surrounding water-trough, T, into which a flange, K, on the receptacle or passage R dips and seals the latter. A cut-off valve, U, is arranged at the lower part of the magazine I, and another one, V, at the top of the discharge-passage R.

When the valve U is closed, or when that valve is open or absent, and a large quantity of the purifying material is in the magazine and rests upon the upper screen, as shown in Fig. 2, then, upon removing the cover P the magazine I can be quickly filled with fresh purifying material while the gas continues to pass through the purifier, and with only slight loss of gas through the magazine.

When the valve V is closed the cover S', or vessel S, can be taken off, and the spent material Y removed from the purifier, while the gas continues to pass through the purifier, and with very little if any escape of gas therefrom, through the passage or receiver R.

When the magazine I is sufficiently charged, and is sealed at its top and is open at its bottom to the screen F, and the screens are all covered by the layers of purifying material, and the passage or receiver R is sufficiently empty, and sealed at its bottom by the cover or vessel S or S', and open at its top to the chamber A; then, by turning the screens F the purifying material will be progressive, and simultaneously passed from the magazine to the upper screen, and from the upper screen to the next lower ones in succession, and from the lowest screen into the receiver R so as to thereby change the material of the layers on the screens, either wholly or in part, according to the extent of turning the screens while all the layers continue complete, and while the gas continues to pass through, and to be purified by the layers in succession, and without loss of gas. The cover P should be kept sealed on the magazine, except while refilling the latter; and the cover S or S' should be constantly sealed on the passage or receiver R, except while removing the spent material therefrom.

In Figs. 6 and 7, the vessel S is mounted on wheels like a wagon or cart. In Fig. 6, the vessel must be raised, and held up to seal the dip-flange $k$ in the trough T. In Fig. 7, the dip-flange $k$ is of a siphon-form, and movable up and down, and dips at its upper end into a water-trough, $t$, around the passage R; and, at its lower end, into the trough T, so as to seal the passage R and vessel S together without raising the latter.

By lowering the vessel S below the dip-flange $k$ in Fig. 6, and by raising the dip-flange $k$ in Fig. 7 above the vessel S, the latter will be unsealed, and can be drawn from under the passage R, and then a cup-like cover can be inverted over the vessel S and into the trough T, as indicated by the dotted lines in Figs. 6 and 7, so as to thereby close the vessel S gas-tight, and thus prevent the escape therefrom of the deleterious gases given off by the spent purifying material while the latter is being drawn away from the premises in said vessel.

The geared ends of the shafts G, Figs. 4 and 6, which turn the screens F, may each have a gas-tight passage through the side $c$ of the chamber; or may all be covered by one gas-tight case, $l$, and turned from the outside by a pinion, $m$, gearing into one of the series of wheels H, and fast on a shaft, $n$, which extends through a gas-tight box in the case $l$, and to which power can be applied by a hand-crank, or belt and pulley, or other means, to turn the screens occasionally, as shall be necessary, or to give a slow, constant, turning motion to the screen, as may be desired.

The screens may be turned by any suitable means.

The valves U and V are in the gas-space of the purifier, and have racks gearing into pinions on shafts $p$ and $q$, which extend, through gas-tight sockets, to the outside of the purifier, where they can be turned by a crank or other suitable means to open and close the valves.

If desired, a rotary stirrer may be in the magazine I to secure a more even delivery of the purifying material to the upper screen as the latter is turned.

For very small gas-works only one or two of the screens can be used in a purifier; but we generally prefer to use a greater number.

In a purifier through which large quantities of gas are passed rapidly it is very important that the purifying material should be supported on screens in porous, sheet-like, thin, even layers, with intervening vacant spaces, through all of which alternate layers and spaces the gas must pass in succession, in order to prevent the packing of the purifying material by its weight, and to prevent the current of gas from blowing continuous holes through the purifying material so as to let the gas pass through without being purified; and, in order that any part of the gas which may be less purified than other portions in passing through one layer, shall commingle with such other portions in the space between the layers before passing through the next layer.

We are aware that it has been proposed to purify illuminating-gas by means of an automatic apparatus, in which the gas was to be passed through a mass of purifying material between, upon, and over several turns of a perforated plate or plates in the form of a thread of a screw, fitting and turning in a vertical cylinder, into and from which the purifying material was to be discharged in masses by sliding trap-valves.

What we claim as new, and desire to secure by Letters Patent, is—

1. A gas-purifier having therein an endless screen, or two or more such screens, upon which the purifying material is supported in the form of a sheet-like layer or layers through which the gas is compelled to pass, and from which endless screen or screens the spent material is discharged by turning said screen or screens substantially as herein described.

2. The combination of a gas-purifier having therein one or more endless screen or screens, and a hopper or magazine from which the purifying material is delivered in a layer or layers upon the said screen or screens by turning the latter, substantially as described.

3. The combination of a gas-purifier having therein one or more endless screen or screens, a magazine or hopper for the fresh purifying material, and the gage J, or its equivalent, as herein described.

4. In combination with one or more rotary endless screen or screens in a gas-purifier, the gas-intercepting guard or guards K arranged on the casing of the purifier and against the sheet-like layer or layers of purifying material on said endless screen or screens, as herein described.

5. In combination with two or more endless purifying screens, mounted one over another, and simultaneously turned in opposite directions, in a gas-purifier, substantially as de-described, the deflecting gas guard or guards L, arranged on the casing of the purifier and between the discharging and receiving ends of adjacent screens, as herein set forth.

6. In combination with two or more simultaneously-turning screens, which deliver the purifying material from one screen to the other, in a gas-purifier, substantially as described, the gage or gages M, arranged over and adjacent to the receiving place or places of said endless screen or screens, as set forth.

7. The combination of the clearing lag or lags N, with the endless purifying screen or screens F, in a gas-purifier having a bottom, $b$, or guard or guards K, arranged in respect to said endless screen or screens, as herein described.

8. A gas-purifier, in which the lime or other purifying material is supported on one or more endless screen or screens in which the apertures are automatically enlarged and contracted in or by turning of said endless screen or screens, substantially as herein set forth.

9. A rotary endless gas-purifying screen, having transverse rods $e$ secured together by links $f$ and intermediate rods $g$ held loosely in and by said links, substantially as herein described.

10. The combination of a gas-purifier, through which the purifying material is passed upon one or more turning endless screen or screens, a closed receptacle, R, which receives the spent material discharged from said screen or screens, and a closed hopper or magazine, I, which delivers the fresh material to the said screen or screens, substantially as described.

11. In combination with a gas-purifier having therein one or more endless, turning, purifying screen or screens, a hopper or magazine, I, furnished with a removable cover made gas-tight by a hydraulic seal, and, with or without a cut-off valve, U, at the lower part of the magazine or hopper, as described.

12. In combination with a gas-purifier from which the spent purifying material is discharged automatically, substantially as described, the valve V and discharge-passage or receptacle R having an opening in the bottom with or without a valve therein, and furnished with a removable vessel or cover, S or S', connected with said passage or receptacle by a hydraulic seal, substantially as described.

13. In combination with a gas-purifier having an elevated downward-discharge passage, surrounded by a dip-flange, $k$, a removable vessel, S, with or without carrying-wheels thereon, and having a surrounding water-trough, T, arranged so as to receive and seal the said dip-flange $k$, and the flange of a removable cup-like cover which will fit over the said vessel upon removing the latter from the said discharge-passage, substantially as set forth.

14. A gas-purifier, in which the purifying material is supported in the form of sheet-like layers on screens with an intervening space or spaces, through which succession of alternate layers and spaces the gas is passed, and in which purifier the purifying material is introduced, changed in the layers therein, and discharged from the purifier, without either stopping the flow of gas through the purifier or interrupting the purifying action of the latter, or material loss of gas therefrom, by means substantially as herein described, or any equivalent therefor.

JAMES T. GOODFELLOW.
FREDERICK A. SABBATON.

Witnesses:
 THOS. J. GILCOYNE,
 HENRY C. SHIELDS.